FURST, BRADLEY & LACEY.

Horse Rake.

No. 1,520. Reissued Aug. 11, 1863.

Witnesses:

J. D. Ward.
A. J. Sturtevant

Inventors:

Conrad Furst.
Dessell Bradley.
John Lacey.

N. PETERS. Photo-Lithographer, Washington, D. C.

UNITED STATES PATENT OFFICE.

CONRAD FURST, DAVID BRADLEY, AND JOHN LACEY, OF CHICAGO, ILL.

IMPROVEMENT IN HORSE-RAKES.

Specification forming part of Letters Patent No. 34,953, dated April 15, 1862; Reissue No. 1,520, dated August 11, 1863.

*To all whom it may concern:*

Be it known that we, CONRAD FURST, DAVID BRADLEY, and JOHN LACEY, of the city of Chicago, in the county of Cook and State of Illinois, have invented certain new and useful Improvements in Horse-Rakes; and we hereby declare that the following is a clear and exact description thereof, reference being had to the accompanying drawings, and to the letters of reference marked thereon, in which—

Figure 1:
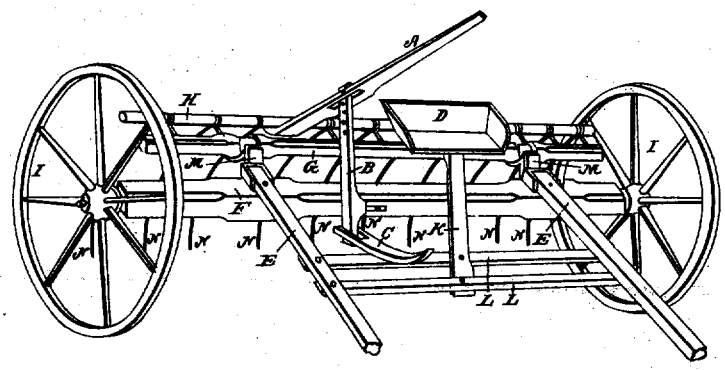
Figure 2:
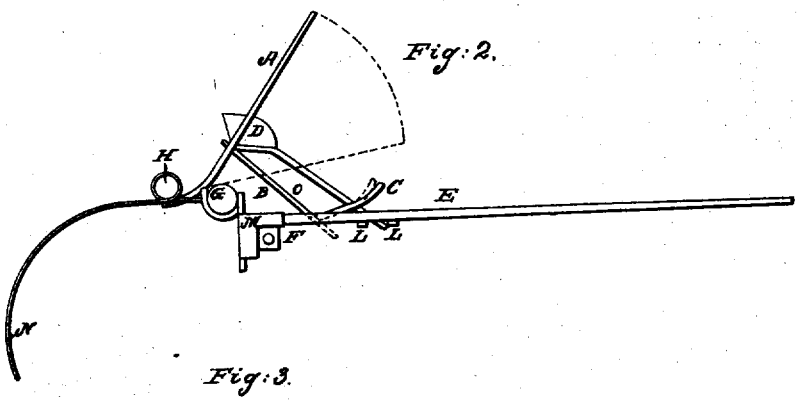
Figure 3:
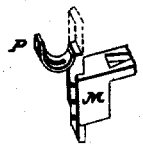

Figure 1 is a perspective view; Fig. 2, a side and sectional view, the section being cut at the shaft E; Fig. 3, a perspective view of the slide and socket P and M detached.

The object of this invention is to obtain a horse-rake that shall, first, be cheap and simple in its construction, and, secondly, one that will be attended with but little labor in its operation, as but little strength is required to manage it in all kinds of work, and is operated either by the hand or foot, or by both. The purpose of the rake is to gather or rake into windrows or gavels hay or grain, and is also adapted to gleaning wheat or other grain from stubble ground, as will be hereinafter described.

To enable others skilled in the art to make and use our invention, we will proceed to describe its construction and operation.

The rake-head H and G, axle F, seat D and its supporter K, shafts E E, cross-bars L L, and wheels I are usually made of wood, of suitable lengths and sizes, and are put together as shown in Fig. 1, constituting the rake-head and carriage-frame.

Attached to the back and upper sides of the axle, at suitable distances apart to receive the shafts or thills, are two dovetailed sockets, M M, Fig. 1, which are made of cast-iron or other suitable material, and constructed in front so as to receive the rear ends of the shafts E E, although it is not material to receive them in a dovetail, as shown in Fig. 3.

At the back of these sockets *m m* we make dovetailed apertures or slots running perpendicularly their entire length. In these slots we insert the slides P, Fig. 3, which are also made of metal, and are fitted to the slots, and held in place, when raised or lowered, by the use of an ordinary bolt or screw. At the upper end of these slides a projection or curved arm is carried out, so as to support the rake-head and allow it to turn, the object of such slide and socket being to allow the use of different-sized wheels, and at the same time preserve the proper pitch and position of the rake-teeth N N, and also, in gleaning, to bring the rake-head a suitable distance from the ground to take up grain in stubble-fields and avoid gathering manure or other substances lying on the ground not desirable to be gathered. By the use of this slide and socket the buyer is not obliged to purchase wheels with the rake, as the axle is usually constructed so as to be adapted to ordinary wagon or carriage wheels, so that the rake may be adapted to their various heights without any expense, and thereby lessening the original cost of the rake very much. The rake-teeth N are made of spring-steel wire, and are attached to the head as shown at Fig. 2.

To the rake-head H G we attach a lever, A, in the manner shown at Fig. 2, and to this lever (see Fig. 1) we attach a connecting-bar, B, which is provided with a series of holes, so as to preserve the positions of the levers when the slide P is raised or lowered, and also to adjust the position of the teeth. Near the lower end of this bar we place a foot-pad or pin, *o*.

The lower end of the bar B is connected with the heel of a treadle or foot-lever, C, which said treadle is made of any desired length, and hinged, at or near its middle, on the rear cross-bar, L, about half-way from the seat to the shaft.

The driver's seat D is placed midway between the shafts, and raised the proper distance above them to enable the driver to operate the rake either by hand or foot. It is operated by hand by simply using the lever A, and by foot by using the treadle C in conjunction with the pin or foot-pad *o*. This arrangement also enables the operator to make the rake "dig" or press firmly on the ground by pressing his foot on the outer end of the treadle C, and prevents the rake from slipping over the hay or grain when damp or when the rake is heavily loaded. It also enables the manufacturer to construct the rake of light materials and at the same time make it effective. Pressing the lever A with the hand or the foot-pad *o* with the foot will discharge the rake, and in either way the operator is not obliged to dismount or leave his seat, thus making a horse-rake which is complete in its operations and so easily worked that it may be used by a boy.

We do not claim as our invention the lever A when standing alone or when simply used for the purpose of operating the rake by hand, nor any of the parts not especially claimed; but

What we claim as our invention, and desire to secure by Letters Patent, is—

1. The slide and socket M and P, arranged in combination with a rake-head and axle, substantially as and for the purposes specified.

2. The combination of the lever A, connecting-bar B, foot-pad or pin *o*, and the treadle C with the rake-head, substantially as set forth and specified.

CONRAD FURST.
DAVID BRADLEY.
JOHN LACEY.

Witnesses:
L. L. BOND,
WILLIAM BETTLES.